(12) United States Patent
Kawash et al.

(10) Patent No.: US 10,162,350 B2
(45) Date of Patent: Dec. 25, 2018

(54) SYSTEMS AND METHODS FOR CONTROLLING THE TRANSPORTATION OF VEHICLES

(71) Applicant: Universal City Studios LLC, Universal City, CA (US)

(72) Inventors: Sameer Kawash, Orlando, FL (US); Michael R. Kiddoo, Orlando, FL (US); Eric Parr, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 694 days.

(21) Appl. No.: 14/482,975

(22) Filed: Sep. 10, 2014

(65) Prior Publication Data

US 2016/0070262 A1 Mar. 10, 2016

(51) Int. Cl.
*G05D 1/00* (2006.01)
*A63G 25/00* (2006.01)
*G05D 1/02* (2006.01)

(52) U.S. Cl.
CPC ........... *G05D 1/0027* (2013.01); *A63G 25/00* (2013.01); *G05D 1/0297* (2013.01); *G05D 2201/0214* (2013.01)

(58) Field of Classification Search
CPC ..... G05D 1/0005; G05D 1/0297; A63G 25/00
USPC ......................................................... 703/2, 8
See application file for complete search history.

(56) References Cited

U.S. PATENT DOCUMENTS

| 5,403,238 | A  | * | 4/1995  | Baxter ................... A63G 31/16 104/78 |
| 5,823,884 | A  |   | 10/1998 | Ager |
| 5,901,398 | A  | * | 5/1999  | Ishikawa ................. B60S 3/004 104/165 |
| 6,445,093 | B1 |   | 9/2002  | Binnard |
| 6,889,815 | B2 |   | 5/2005  | Kanamori et al. |
| 7,484,460 | B2 | * | 2/2009  | Blum ....................... A63G 7/00 104/53 |
| 9,205,828 | B1 | * | 12/2015 | Lombrozo ............ B60W 30/00 |
| 9,598,077 | B2 | * | 3/2017  | Yamakado ................ B60T 7/12 |

(Continued)

FOREIGN PATENT DOCUMENTS

EP  0125331  11/1984

OTHER PUBLICATIONS

PCT/US2015/047018 Invitation to Pay Additional Fees dated Oct. 23, 2015.

*Primary Examiner* — Andre Pierre Louis
(74) *Attorney, Agent, or Firm* — Fletcher Yoder, P.C.

(57) ABSTRACT

A system may include a plurality of grid elements, an analytic system, and a control system. The plurality of grid elements are installed in a dynamic driving area in an attraction and are configured to perform based on command instructions received from the control system to control the movement of a vehicle disposed on the plurality of grid elements. The analytic system may be configured to track, via one or more sensors, vehicle information and to send the vehicle information to the control system via a communication module, and the control system may be configured to receive the vehicle information, to determine, via one or more processors, which of the grid elements to actuate and a corresponding manner of actuation based on a desired movement of the vehicle, and to send command instructions including performance data to each of the grid elements identified for actuation.

24 Claims, 11 Drawing Sheets

(56) References Cited

U.S. PATENT DOCUMENTS

| | | |
|---|---|---|
| 2002/0197585 A1 | 12/2002 | Moran |
| 2003/0140815 A1 | 7/2003 | Norbury |
| 2005/0065676 A1 | 3/2005 | Philipson et al. |
| 2006/0063137 A1* | 3/2006 | Robbins ................ G09B 19/16 434/61 |
| 2009/0257860 A1 | 10/2009 | Schafer |
| 2013/0012328 A1 | 1/2013 | Stoker |
| 2015/0284010 A1* | 10/2015 | Beardsley ............ B60W 50/10 701/41 |

* cited by examiner

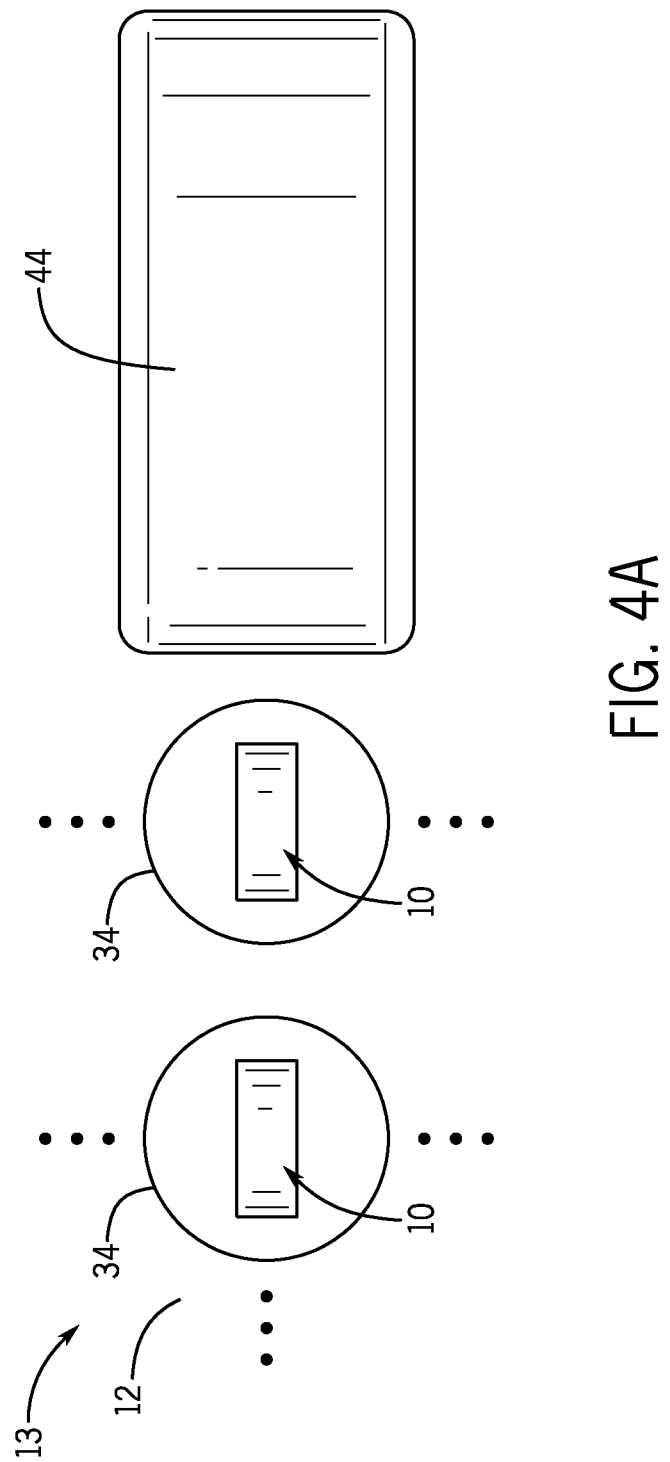

SYSTEMS AND METHODS FOR CONTROLLING THE TRANSPORTATION OF VEHICLES

BACKGROUND

The present disclosure relates generally to vehicle transportation, and more particularly to systems and methods for controlling the transportation of vehicles in an amusement park attraction.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks often include attractions that involve maneuvering of vehicles for entertainment value. Such attractions may include rides that operate to transport guests or patrons of the amusement park. For example, vehicles operated by patrons may be allowed to drive around a designated area (e.g., a bumper car room, go-cart track), vehicles may transport patrons along fixed or controlled pathways, and so forth. Attractions that involve maneuvering of vehicles for entertainment value may also include exhibitions (e.g., stunt shows) that are performed live to provide visual stimulation based on actions performed by vehicles. For example, vehicles operated by stunt drivers may perform complicated maneuvers involved in a scene of a live stunt show. Traditional systems for maneuvering and controlling the movement of such vehicles are limited with respect to the nature of the movements that can be performed in these types of attractions. It is now recognized that it is desirable to provide improved systems and methods for controlling vehicle movements that provide excitement for viewers and riders.

BRIEF DESCRIPTION

Certain embodiments commensurate in scope with the originally claimed subject matter are discussed below. These embodiments are not intended to limit the scope of the disclosure. Indeed, the present disclosure may encompass a variety of forms that may be similar to or different from the embodiments set forth below.

In accordance with one aspect of the present disclosure a system may include a plurality of grid elements, an analytic system, and a control system. The plurality of grid elements may be installed in a dynamic driving area in an attraction and may be configured to perform based on command instructions received from the control system to control the movement of a vehicle disposed on the plurality of grid elements. The analytic system may be configured to track, via one or more sensors, vehicle information including the vehicle's position, size, velocity, acceleration, or any combination thereof, and to send the vehicle information to the control system via a communication module, and the control system may be configured to receive the vehicle information via a communication module, to determine, via one or more processors, which of the plurality of grid elements to actuate and a corresponding manner of actuation based on a desired movement of the vehicle, and to send command instructions including performance data to each of the plurality of grid elements identified for actuation.

In accordance with another aspect of the present disclosure a system may include a plurality of grid elements, an analytic system, and a control system. The plurality of grid elements may be configured to control the movement of a self-propelled vehicle when engaged with the vehicle and may be dispersed in a stage of a dynamic driving area of an amusement attraction, the analytic system may be configured to monitor information of the vehicle including an angular velocity and planar direction of a driven wheel of the vehicle and send the information to the control system, the control system may be configured to send command instructions to the grid elements to rotate a movement control unit of the grid element based on the planar direction and the angular velocity of the driven wheel at a determined actuation time.

In accordance with another aspect of the present disclosure a method may include tracking, via an analytic system, vehicle information for one or more vehicles, where the one or more vehicles are driving on or approaching a dynamic driving area of an attraction, sending, via the analytic system, the vehicle information to a control system utilizing a communication module of the analytic system and a communication module of the control system that are communicably coupled, determining, via the control system, which of a plurality of grid elements installed in the surface of the dynamic driving area to actuate and a manner of actuation based on the vehicle information received by the control system from the analytic system and a desired movement for the one or more vehicles, sending, via the control system, command instructions comprising performance information to each of the plurality of grid elements identified for actuation utilizing the communication module of the control system and a communication module of the selected grid elements, and executing the command instructions via movement control units of the plurality of grid elements identified for actuation.

DRAWINGS

These and other features, aspects, and advantages of the present disclosure will become better understood when the following detailed description is read with reference to the accompanying drawings in which like characters represent like parts throughout the drawings, wherein:

FIG. 4A and FIG. 4B illustrate a top view and a side view, respectively, of the grid elements of FIG. 1 installed in a dynamic driving area in relation to a wheel of a vehicle, in accordance with an embodiment;

DETAILED DESCRIPTION

Figure 1:
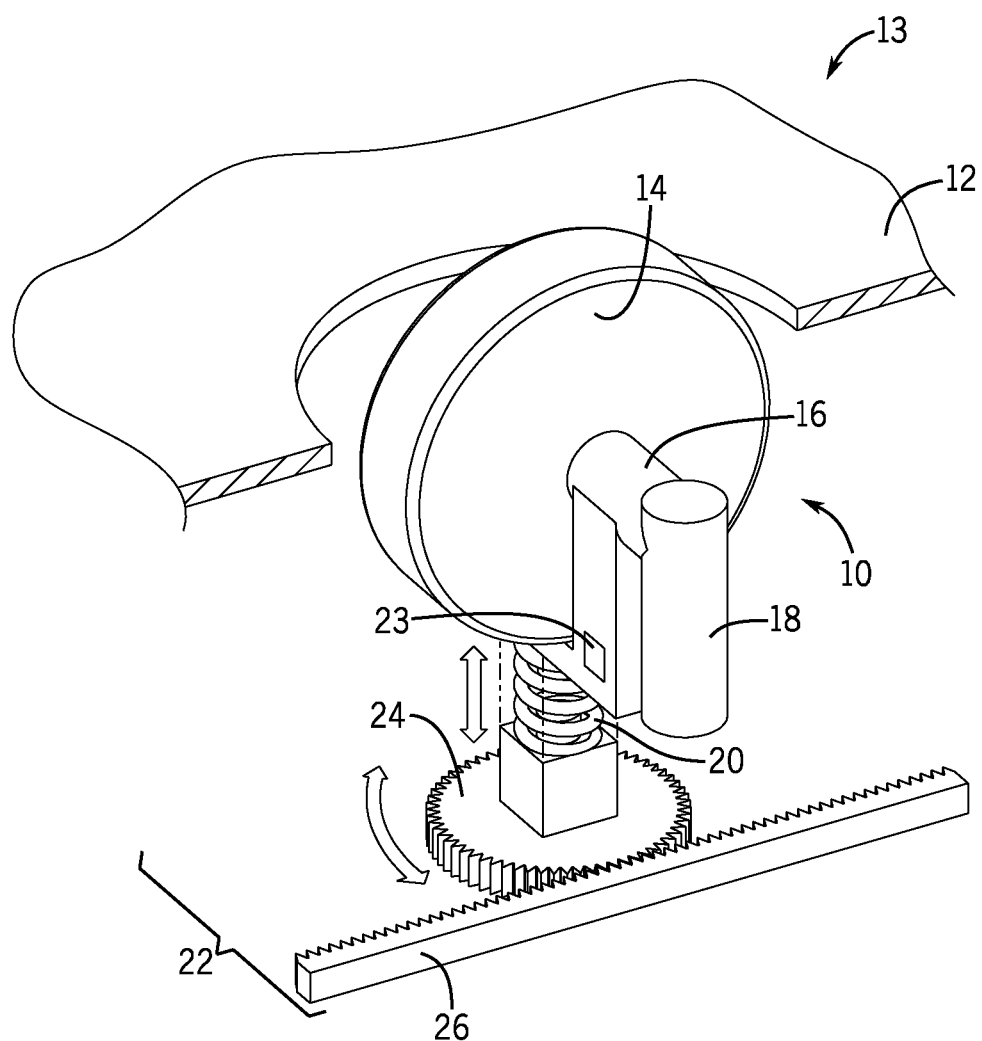
FIG. 1 illustrates a grid element installed in a dynamic driving area, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Attractions at amusement parks that involve moving vehicles may be limited by the physical constraints of the vehicle and the nature of the area (e.g., track, arena, path) on which the vehicle is driven, which may be referred to as a "driving area." For example, in a car show attraction, the maneuvers that a stunt driver may perform are typically ones that any vehicle is capable of when driving on a normal road, such as donuts, burn-outs, swerving, trail braking, pursuit intervention technique (PIT) maneuvers, and the like. The same may be true for vehicles utilized in rides driven by patrons, such as bumper cars, go-carts, and so forth. Moreover, each of the maneuvers performed in the car show and/or ride occur in a manner that the viewer or operator expects in real-time. That is, these vehicles and their associated driving areas are traditionally not capable of enabling certain specialized maneuvers and/or effects that appear to defy natural motion.

Present embodiments are directed to facilitating controlled maneuvering of vehicles, whether as part of a show or ride, in a manner that gives the illusion of time-controlled action. Time-controlled action may refer to a simulation of variable speeds of action as though time is being controlled. During time-controlled action, certain normally imperceptible events may be slowed enough that they may be perceived by a viewing audience and/or patrons. For example, time-controlled action may include slowing down a vehicle near instantaneously, performing a maneuver (e.g., a 180° or 360° turn) in slow motion during the slowed period, and rapidly accelerating the car back to its initial speed. Systems and methods for simulating this effect as a component of a live action show or ride may create the impression that the vehicle, viewers, and/or riders are actually experiencing slow-motion and/or that there is a time-lapse. Typically, this type of action is an effect generated in movies and video games. However, creating such an effect in person with vehicles in a show and/or ride may greatly enhance an attraction's likeability by providing a more visually stimulating experience The techniques provided in the present disclosure facilitate control of vehicles in live action to provide the illusion of time-controlled action. In some embodiments, a plurality of vehicles may experience variable speeds and direction changes while being transported through a driving area of dynamically controlled grid elements. A driving area including such grid elements may be referred to as a "dynamic driving area." The grid elements may enable near instantaneous deceleration, up to 360° maneuvers at a controlled speed, rapid acceleration, and so forth. The driving area may include numerous holes along its surface where the grid elements are installed. Each grid element may include a movement control unit (e.g., wheel, linear coil, magnet) that is vertically actuated through the hole, positioned in a specific direction and angle, and controlled to provide a desired force.

An analytic system may track vehicle information (e.g., speed, size, position) and relay that information to a control system. The control system may determine which grid elements to actuate and the desired performance of each grid element to coordinate a desired specialized vehicle maneuver and/or effect based on the vehicle information. Then, the control system may command the grid elements to operate as desired to control the transportation of the vehicle through the dynamic driving area. In other embodiments, the vehicle may utilize a position tracking system to send its information to the control system directly. In this way, a speeding vehicle may be transitioned to controlled movement and may be made to appear as though it is moving in time-controlled action by utilizing the grid elements in certain coordinated configurations to slow the vehicle down near instantaneously, perform a maneuver at the controlled slower speed, and rapidly accelerate to a desired faster speed. As may be appreciated, the benefits of this disclosure may provide for attractions that are more exciting and fun to watch and/or ride.

With the foregoing in mind, FIG. 1 illustrates an embodiment of a grid element 10. The grid element 10 may partially extend through a surface 12 of a dynamic driving area 13 that vehicles traverse throughout the course of a show and/or ride. There may be numerous (e.g., tens, hundreds, thousands) grid elements 10 installed as components of the dynamic driving area 13 depending on the nature of the show and/or ride designed. For example, in some embodiments, the vehicle may not motivate itself when placed on the dynamic driving area 13 and the grid elements 10 may be responsible for motivating the vehicle throughout the entire show and/or ride. In such a scenario, the surface 12 may simply provide dividers between grid elements 10 or may be completely excluded and the grid elements 10 may be packed densely to provide the dynamic driving area 13. In other embodiments, the vehicle may motivate itself through some portions of the show and/or ride but not in other portions where the specialized maneuvers and/or effects simulating time-controlled action are performed. In those portions in which time-controlled action is simulated, the dynamic driving area 13 may include the grid elements 10 required to control the transportation of the vehicle to perform the maneuver and/or effect and exclude the grid elements 10 in other areas.

In some embodiments, the grid element 10 may include a movement control unit 14, a shaft 16, a motor 18, a vertical actuator 20, a direction configuration unit 22, communication and control circuitry 23, or some combination thereof. The movement control unit 14 may include a wheel that is enabled to spin forward or backward at a desired speed via the shaft 16 and the motor 18, which represents a rotation configuration unit, and in any direction via the direction configuration unit 22. That is, the rotation configuration unit may be configured to rotate the movement control unit 14 at an angular speed and the direction configuration unit 22 may be configured to turn the movement control unit 14 into alignment with a planar direction. Further, the movement control unit 14 may be raised or lowered by the vertical actuator 20, which may be one of an electric, hydraulic, pneumatic, or the like. When the grid elements 10 are not being utilized for a maneuver and/or effect, they may be lowered and hidden beneath the surface 12 by the vertical actuator 20. In some embodiments, during certain phases of operation, the grid elements 10 are aligned with the surface 12 and locked into place in a coordinated manner. For example, the movement control unit 14 may be lowered such that its uppermost part is aligned with the surface 12 and then locked into place to serve as essentially an extension of the surface for vehicles to travel over. In embodiments that include densely packed grid elements 10 (e.g., embodiments with no substantial fixed surface 12), the grid elements 10 may lock into place during certain phases of operation to act in coordination as a fixed surface that allows a vehicle to gain traction thereon. In yet other embodiments, the vertical actuator 20 is excluded and the upper portion of the movement control unit 14 aligns the surface 12 or essentially forms a surface with other densely packed grid elements 10.

When the grid element 10 receives and/or executes a command at the communication and control circuitry 23 to actuate and perform movement control, the vertical actuator 20 may raise the movement control unit 14 for momentary super-grade exposure (e.g., above the surface). By doing this, the movement control unit 14 will contact the vehicle's base (e.g., the vehicles wheels or a base pad) and spin in a desired direction and at a desired speed to control the vehicle's transportation. For example, if a self-propelled vehicle that is motivated by rotating wheels is driven over the movement control unit 14, the movement control unit 14 may rotate in a direction counter to that of the vehicle's wheels to create a treadmill effect. As a specific example, such a vehicle may be traveling at a high rate of speed and the control unit 14 along with other coordinated control units may mirror the rotation of the vehicles wheels such that, to an observer, the vehicle appears to have stopped when driven onto the coordinated control units 14. After a particular grid element 10 or set of grid elements 10 has served its part, the vertical actuator 20 may lower the movement control unit 14 beneath the surface 12, once again, until further use is requested. In some embodiments, the control unit 14 may be lowered into alignment with the surface and/or locked into place when no longer being used to create special effects on a vehicle.

In other embodiments, the movement control unit 14 may include a linear coil that receives three-phase electric power to generate a magnetic field as part of a linear induction motor. The linear coil may be raised and lowered similarly utilizing the vertical actuator 20 as needed. In this embodiment, the vehicles traveling across the dynamic driving area 13 will include reaction plates that are conductors (e.g., sheet of aluminum) attached to the bottom of the vehicles. When the vehicles move over a raised coil receiving power, the reaction plates will pass through the linear coil's magnetic field and generate its own magnetic field due to induced eddy currents. The two magnetic fields may repel and/or attract, causing the vehicle to accelerate or slow down.

In another embodiment, the movement control unit 14 may include a linear coil that receives three-phase electric power to generate a magnetic field as part of a linear synchronous motor. In this embodiment, the vehicles traveling across the dynamic driving area 13 will include an array of alternating pole magnets attached to the bottom of the vehicles. When the vehicles move over a powered coil generating a magnetic field, the magnets may repel and/or attract based on polarity in order to accelerate or slow down the vehicle.

Further, the communication and control circuitry 23 may receive command instructions from the control system or read instructions stored in an internal memory to perform in a desired way. In either case, the instructions may include the movement control unit 14 spinning at a certain speed or otherwise being activated (e.g., activating a magnetic field) to generate movement in a particular direction. For example, the motor 18 may turn the shaft 16 to produce a certain number of revolutions per minute (RPM) of the movement control unit 14 (tire) to generate a desired velocity for a vehicle relative to an audience member. Additionally, the instructions may include steps for positioning the movement control unit 14 in a certain direction so as to control the path of the vehicle. As such, the direction configuration unit 22, which may include a gear 24 with teeth or cogs that interacts with another linear part 26 including cogs or teeth to transfer torque to the grid element and rotate it in 360° as desired. Thus, the movement control unit 14 may be turned in any planar direction by controlling the direction configuration unit 22 to change the path of a traveling vehicle.

As may be appreciated, configuring a plurality of the grid elements 10 in certain ways may enable highly precise maneuvers and/or customizable effects. For example, a vehicle's wheels may contact the actuated movement control units 14 of a plurality of grid elements 10, which may be positioned and spinning in a way to control all four wheels of the vehicle by turning them in a tightly controlled 360° circle. Also, in some embodiments, a plurality of raised movement control units 14 may be spinning rapidly in a reverse direction so that when a vehicle traveling at a relatively high velocity (e.g., 60 miles per hour (mph)) contacts the raised movement control units 14, the vehicle is slowed to a desired speed (e.g., 5 mph) at a near instantaneous rate. The vehicle may then be transported in any desired direction at the reduced speed as the wheels of the vehicle are conveyed from one set of movement control units 14 to another. The movement control units 14 may be controlled to take into account the rotational speed of the vehicles wheels to achieve this effect. This may create the impression that the vehicle is moving in time-controlled action. After the desired maneuver is complete, the vehicle may be conveyed onto movement control units 14 configured to accelerate the car back to its initial speed (60 mph) or any speed, and the vehicle may speed away. In some embodiments, the vehicle may be conveyed to a fixed surface or the movement control units 14 may be locked into place such that the vehicle is able to travel again under its own control. It should be understood, that there may be multiple vehicles traveling across the dynamic driving area 13 being controlled by the grid elements 10 simultaneously. Indeed, the disclosed techniques provide for exhilarating car chases, races, chicken duels, and other scenarios displayed in a show and/or experienced in a ride.

Figure 2:
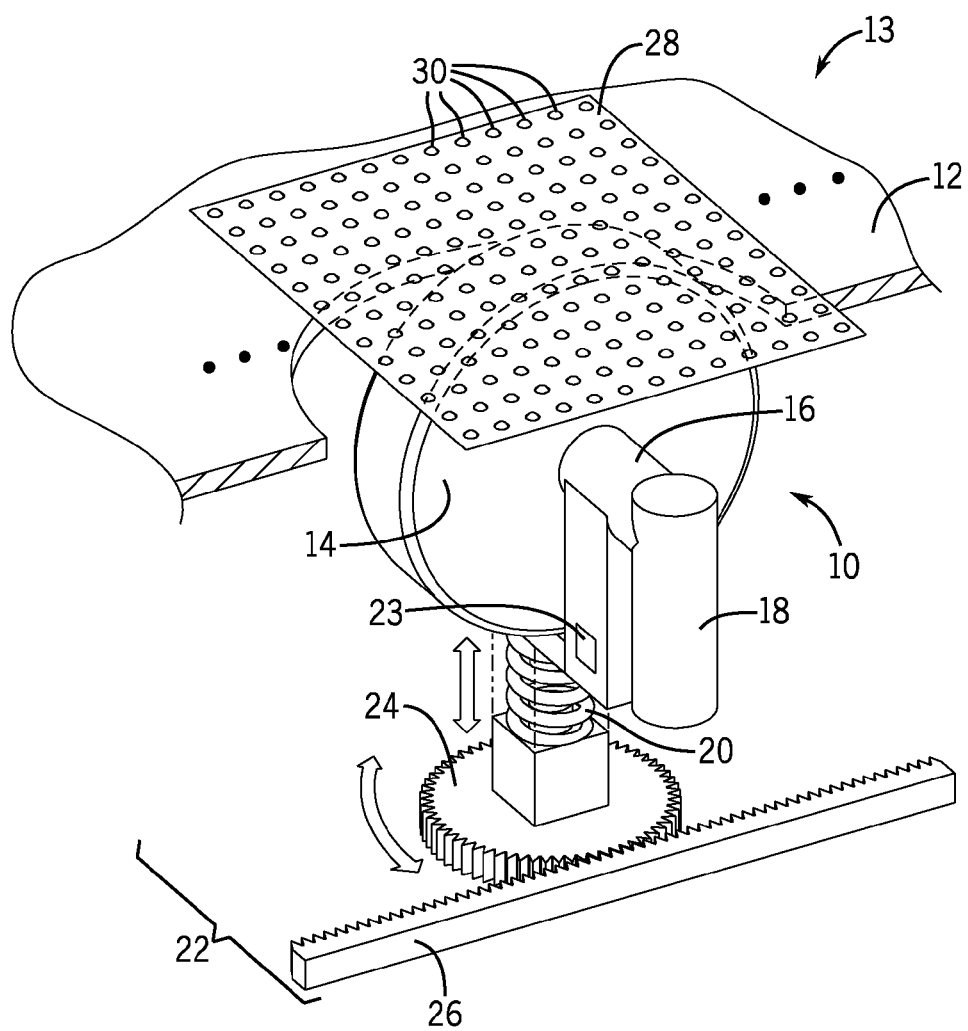
FIG. 2 illustrates a grid element that controls an overlaid sheet of ball bearings installed in a dynamic driving area, in accordance with an embodiment.

In another embodiment, the grid elements 10 may interact with a sheet 28 of ball bearings 30 laid across the top of the surface 12, as displayed in FIG. 2. The ball bearings 30 may be controlled by the movement control unit 14 being raised by the vertical actuator 20 and pressing against the sheet 28 and spinning at a desired speed and/or in a desired direction, which will cause the ball bearings 30 being engaged to rotate in turn. In some cases, the ball bearings 30 may be locked in place by the movement control unit 14 being pressed against the sheet 28 and remaining stationary. In an embodiment, a vehicle may be transported across the sheet 28 as desired by configuring the movements of the ball bearings 30 that contact the vehicle's tires. For example, the movements (e.g., direction, speed) of the ball bearings 30 may be configured by being engaged by the movement control unit 14, and the ball bearings' movements may affect a vehicle's wheels that are engaged with the ball bearings 30 to cause the vehicle to perform specialized maneuvers and/or effects, such as time-controlled action. The grid element 10 may be controlled by command instructions received from a control system or stored locally in a memory and executed by the control and communication circuitry 23. Further, due to the fact that a sheet 28 is covering the movement control unit 14 and the hole through which the movement control unit 14 protrudes, the viewing audience and/or ride patrons may not notice bumps in the surface 12, which may enhance the impression that the vehicle is performing the maneuver and/or effect on its own.

Figure 3A:
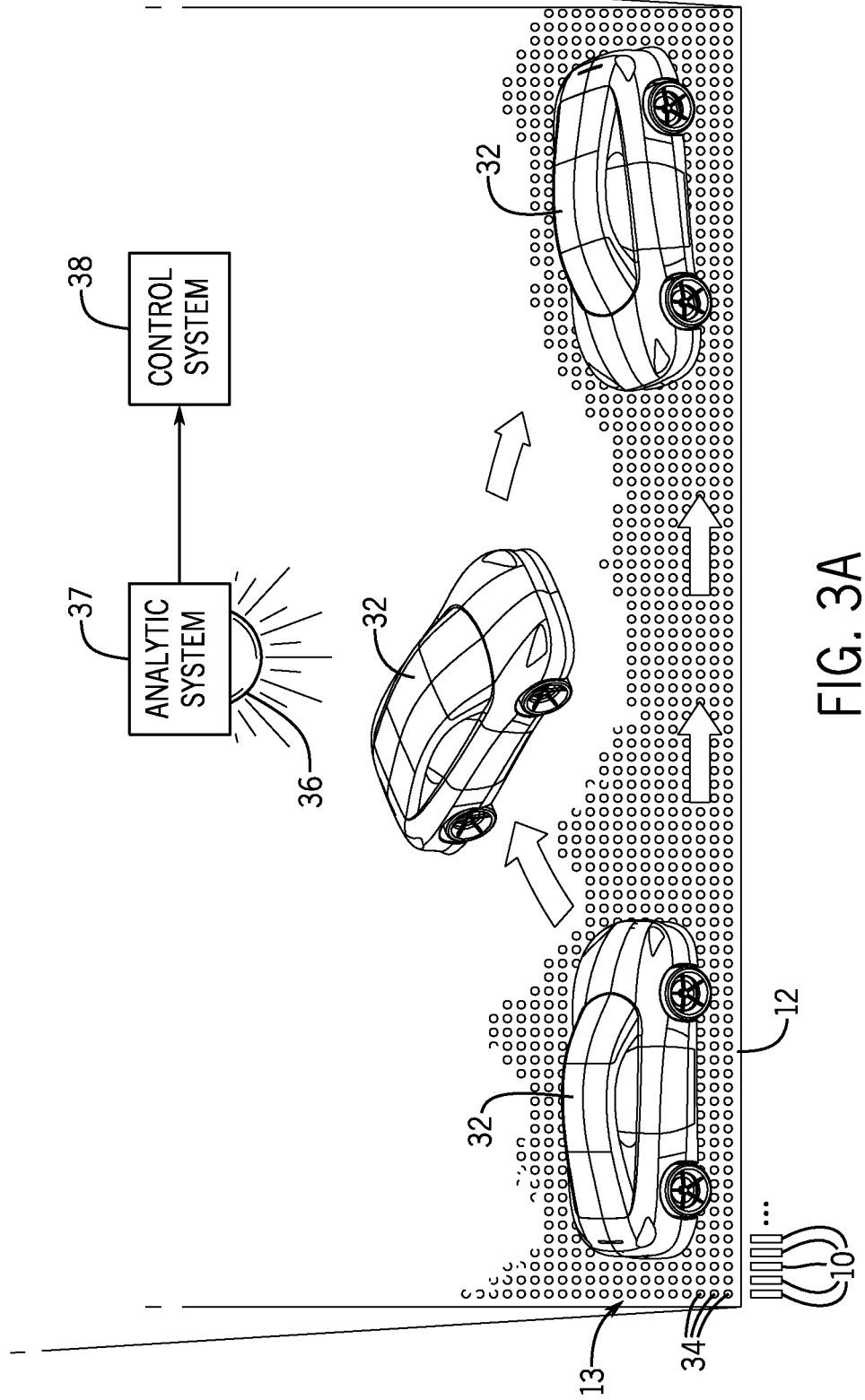
FIG. 3A illustrates a system controlling the transportation of one vehicle that includes grid elements of FIG. 1, an analytic system, and a control system.
Figure 3B:
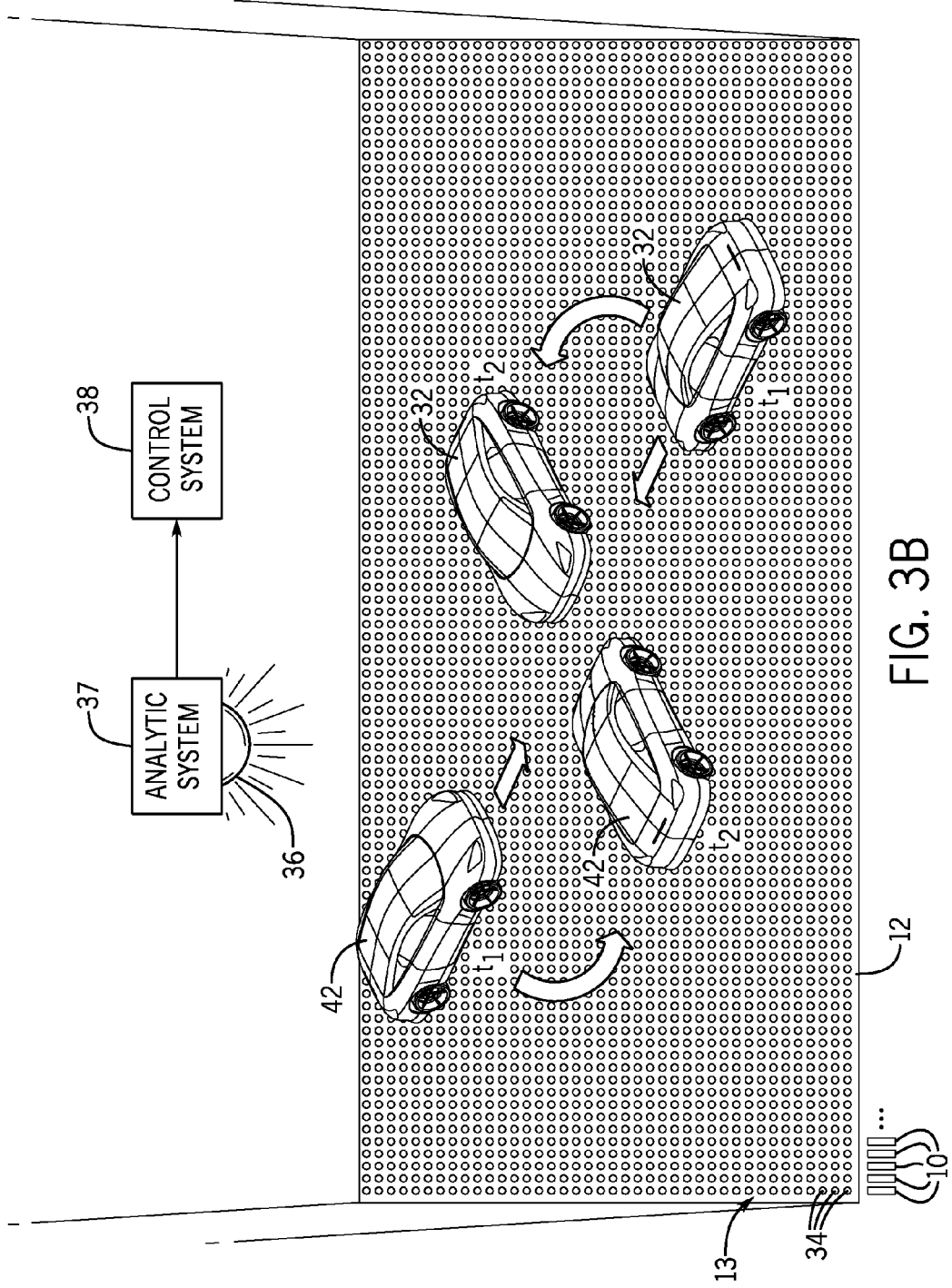
FIG. 3B illustrates the system controlling the transportation of more than one vehicle, in accordance with an embodiment.

FIG. 3A illustrates a system controlling the transportation of one vehicle, and FIG. 3B illustrates the system controlling the transportation of more than one vehicle. Starting with FIG. 3A, as shown, the system is controlling the movement of a vehicle 32 through a maneuver in time-controlled action. The system may include the grid elements 10, a sensor 36, an analytic system 37 with one or more processors and tangible machine-readable memories (e.g., a hard drive), and a control system 38 with one or more processors and tangible machine-readable memories (e.g., a hard drive). The grid elements 10 may be installed in holes 34 or densely packed throughout a dynamic driving area 13, as previously discussed. FIGS. 3A and 3B are schematic representations and it should be noted that the grid elements 10 may only be disposed in a dynamic portion of the dynamic driving area 13 such that there are separate dynamic and non-dynamic portions of the dynamic driving area 13. The sensor 36, which may represent a single sensing unit or a plurality of sensors, may obtain vehicle information (e.g., velocity, tire rotation speed) for the analytic system 37. In some embodiments, the sensor 36 may include an optic system that utilizes a camera and/or lasers to track one or more vehicle and determine the vehicle information. The vehicle information may include the vehicle's velocity, size, acceleration, and position (e.g., angular). Size information for the vehicle 32 may include the vehicle's weight, length, width, height, and so forth. The analytic system 37 may be a monitor including one or more processors configured to instruct the sensor 36 to track vehicle information and to command communication circuitry to transmit the vehicle information to the control system 38 when the analytic system 37 and control system 38 are separated. Then, the analytic system 37 may communicate the vehicle information to the control system 38.

The control system 38, which may include an automation controller (e.g., a programmable logic controller) may be configured to accept the vehicle information as inputs and determine which grid elements 10 to actuate and the desired performance of those grid elements 10. As such, the control system 38 may be configured to understand trajectory, velocity, and acceleration when analyzing the vehicle information to make these determinations. Further, the control system 38 may use the inputs to determine how to angle the grid elements 10 to position the vehicle throughout a maneuver. Then, the control system 38 may output command instructions to the desired grid elements 10 to actuate and perform as determined. As depicted, selected grid elements 10 may receive the output command instructions and actuate at the right times by the control system 38 to convey the vehicle 32 in a controlled 180° spin maneuver at a desired speed. It should be noted that the control system may be configured to control some of the grid elements 10 independently and/or control other grid elements 10 together as a set.

To further illustrate, FIG. 3B depicts more than one vehicles' transportation being controlled throughout a dynamic driving area 13 by the system described above. As shown, a first vehicle 32 and a second vehicle 42 are engaged in a chicken duel scenario in a car show. Additionally or alternatively, the vehicles 32 and 42 may be operated by patrons in a demolition derby or bumper car type ride. In the depicted scenario, the vehicles 32 and 42 may be speeding at each other, creating tension among a viewing audience. The sensor 36 may be tracking the vehicles' information, such as size, velocity, acceleration, position, and so forth, and the analytic system 37 may be communicating that information to the control system 38. The control system 38 may determine that the vehicles 32 and 42 have reached a distance in proximity to each other that triggers a coordinated evasive maneuver in time-controlled action. As such, at an initial time (t1), the control system 38 may send command instructions to selected grid elements 32 to actuate and slow the vehicles 32 and 42 nearly instantaneously, direct each vehicle 32 and 42 in a synchronized, controlled slow-motion left turn around each other at a subsequent time (t2). The grid elements 10 may continue to convey the vehicles 32 and 42 in the controlled turn until they are rotated 180° from their starting points. Then, the grid elements 10 positioned at these points may be configured to accelerate the vehicles in reverse away from each other at a rapid speed. Consequently, viewers watching and/or patrons riding in the vehicles may obtain a thrilling experience.

Figure 4B:
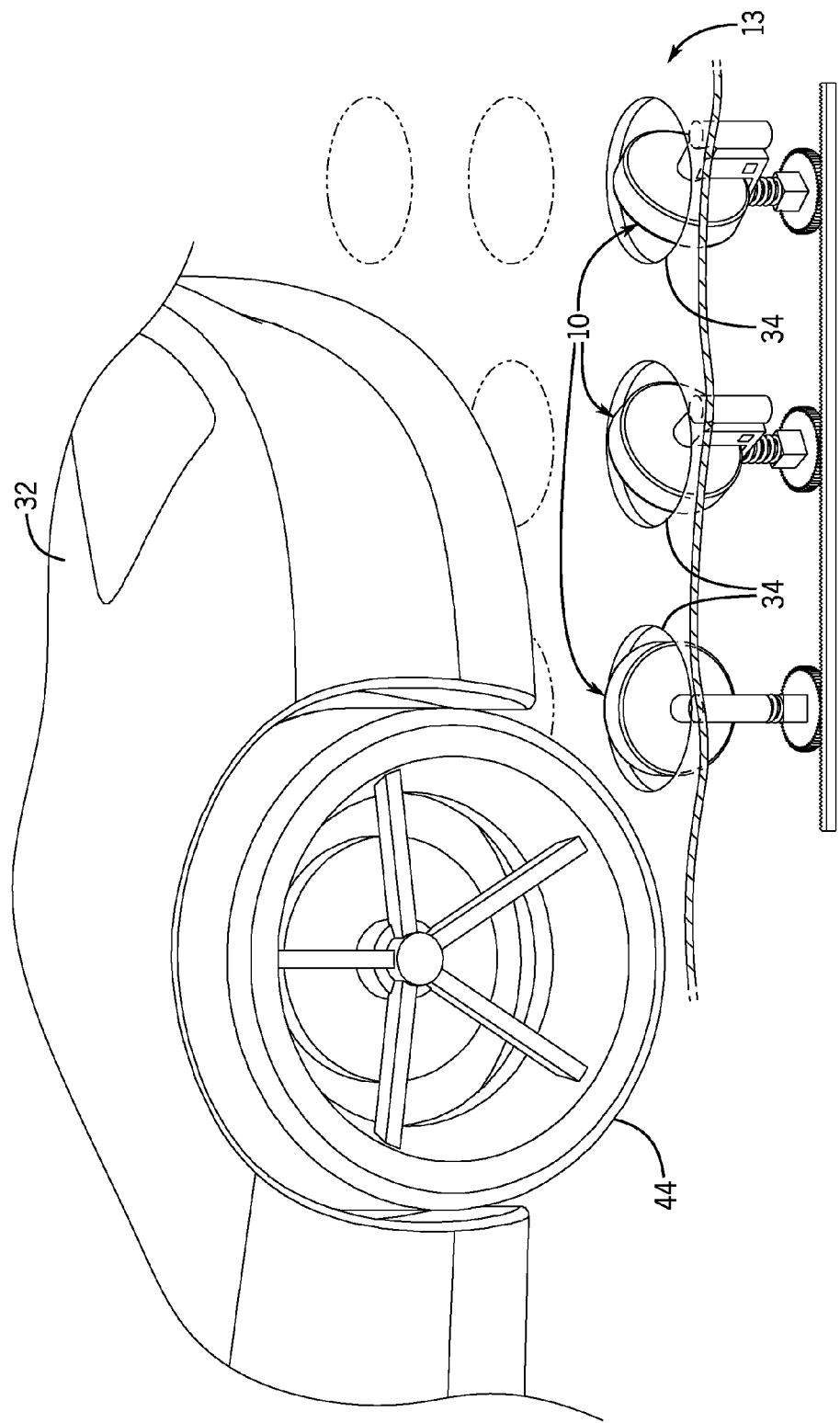

To better understand the sizing of the grid elements 10 installed in the holes 34 along the surface 12 of the dynamic driving area 13 in accordance with certain embodiments, FIG. 4A and FIG. 4B illustrates a top view and a side view, respectively, of the grid elements in relation to a wheel 44 of the vehicle 32. It should be noted that the sizes shown are not exact and are used as approximations for explanatory purposes. Starting with FIG. 4A, the holes 34 in the surface 12 are smaller than the length and width of the portion of the wheel 44 that contacts the surface 12 (referred to as "wheel's contact patch" herein). This may prevent the wheel 44 from falling in the hole 34 and getting stuck. In general, the holes 34 may be small enough so that at least more than one of them is covered by the wheel's contact patch when the vehicle is driving on the surface 12. The granularity of control over the wheel's movement may be more precisely controlled by having more grid elements 10 interacting with the wheel's contact patch at any given point on the surface 12 of the dynamic driving area 13.

Regarding FIG. 4B, as may be seen in the side view, the wheel 44 of the vehicle 32 may interact with at least two grid elements 10 when the vehicle 32 is driven over them. In this illustration, the grid elements 10 are configured in such a way as to produce a left turn gradually by the middle grid element 10 being angled slightly to the left and the far right grid element being angled more sharply to the left. When the tire's contact patch interacts with the far left and middle grid elements 10 it will begin to angle left and when the tire 44 continues to be transported to interact with the middle and far right grid element 10 it will be more sharply angled left. In this way, the size of the grid elements 10 may affect the preciseness of the maneuver and/or effect. Indeed, some holes 34 and their associated grid elements 10 may vary in size throughout the surface 12 of the dynamic driving area 13 depending on the design requirements for a given maneuver and/or effect. For example, in some embodiments it may be desirable to utilize grid elements 10 that are roughly the same size as the wheel's contact patch for the portions of a dynamic driving area 13 where the vehicle is supposed to rapidly decelerate or accelerate. Further, in some embodiments it may be desirable to utilize a lot of very small grid elements 10 that interact with a wheel's contact patch to increase granularity and control for maneuvers and/or effects that have highly technical turn elements. In yet other embodiments, the grid elements 10 may be uniform in size throughout the dynamic driving area 13.

Figure 5:
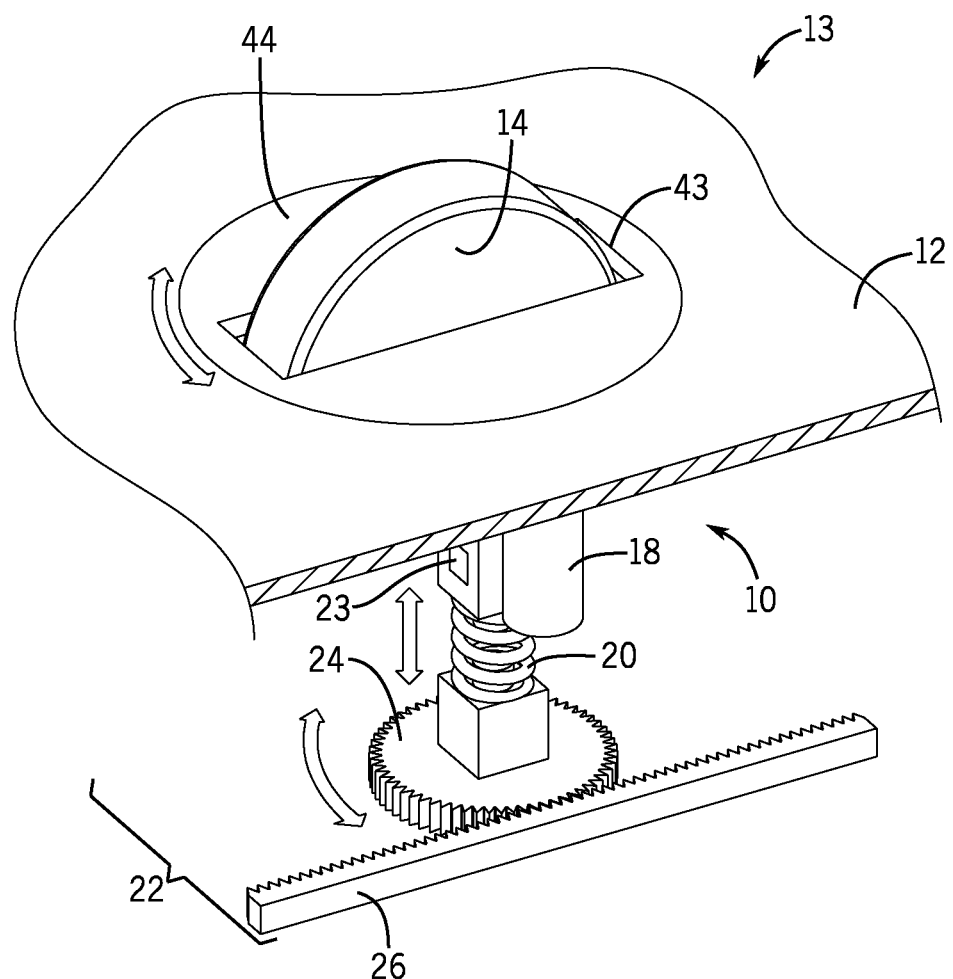
FIG. 5 illustrates a grid element protruding through a slot in a circular portion of a dynamic driving area, in accordance with an embodiment.

In another embodiment, as shown in FIG. 5, the grid element 10 may vertically actuate through a slot in a circular portion 44 installed in a dynamic driving area 13. As depicted, the circular portion 44 may rotate in any direction so that the movement control unit 14 may be positioned as desired by the direction configuration unit 22. More specifically, the circular portion 44 of the surface 12 is configured to rotate in a planar direction with the movement control unit 14 and the rotation configuration unit is configured to rotate the movement control unit about an axis substantially transverse with respect to the planar direction. Further, the slot 43 through which the movement control unit 14 protrudes may be rectangular in shape. As such, the slot 43 may be smaller in size than a circular hole because it includes a reduced width. Thus, the dynamic driving area 13 that includes this embodiment of grid element 10 may include more surface 12 to drive on since the size of the holes are smaller. In turn, this may lessen the chance of a vehicle's wheel getting stuck in a hole when the movement control unit 14 is retracted.

Further, in another embodiment, the grid elements 10 may be dispersed in a maneuverable stage portion of the dynamic driving area 13. Such a stage portion may correspond to the entire dynamic driving area 13 within a non-dynamic driving area or just a portion of the dynamic driving area 13. The stage portion may be configured to move relative to one or more other portions of the driving area (e.g., a separate dynamic and/or non-dynamic area). For example, the stage portion may be circular and configured to rotate in a planar direction and at a desired speed. Thus, when a vehicle speeds onto the stage portion and is subject to the treadmill effect caused by the grid elements interacting with the vehicle, it can appear to be completely stopped and then rotated on the stage portion to simulate a slow motion spin. There may be several stage portions with grid elements 10 located throughout the driving area 13. Each stage portion may cause the plurality of vehicles to perform one or more maneuvers, such as time-controlled action. In some embodiments, the grid elements 10 may only be installed in the one or more stage portions. Thus, the vehicle may include one or more wheels driven by a motor, or the like, and the vehicle may self propel through certain portions of the driving area. As the vehicle drives around, the analytic system 37 may monitor the vehicle's position and an angular velocity and planar direction of the one or more driven wheels by utilizing the sensor 36. The analytic system may send this information to the control system 38, which may determine which grid elements 10 to actuate based on the vehicle's position and speed of the driven wheel as the vehicle approaches a stage and based on the desired action invoked by the stage portion (maneuverable dynamic area).

In order to produce an effect, such as time-controlled action, the control system 38 may send command instructions to the selected grid elements 10 to rotate their movement control units 14 at the same angular velocity and in the same planar direction as the oncoming driven wheel of the vehicle. This may produce a treadmill effect when the driven wheel engages the movement control unit by allowing the one or more driven wheel to continue to rotate but essentially remaining in place. In some embodiments, the outermost grid elements 10 may be controlled to rotate at a slower speed than the driven wheel of the vehicle and the speed of the grid elements 10 closer to the center of the circular stage may incrementally increase. Thus, the vehicle's momentum may overcome the initial grid elements' speed so that the vehicle continues moving until its entire body is located on the stage. Further, incrementally increasing the grid elements 10 speed toward the center of the stage may enable bringing the vehicle to a halt in a more controlled manner. Once the driven wheel is rotating in place on the one or more movement control units 14 of the engaged grid elements 10, the circular stage may be rotated in a planar direction at a desired speed to create the impression that the vehicle is performing a maneuver (e.g., up to 360° turn) in slow motion (e.g., time-controlled action). After the vehicle completes the desired maneuver, the vehicle may drive off or be pushed off of the stage and resume normal operation by the movement control unit reversing directions or lowering beneath the surface or the driven wheel reversing directions.

Figure 6:
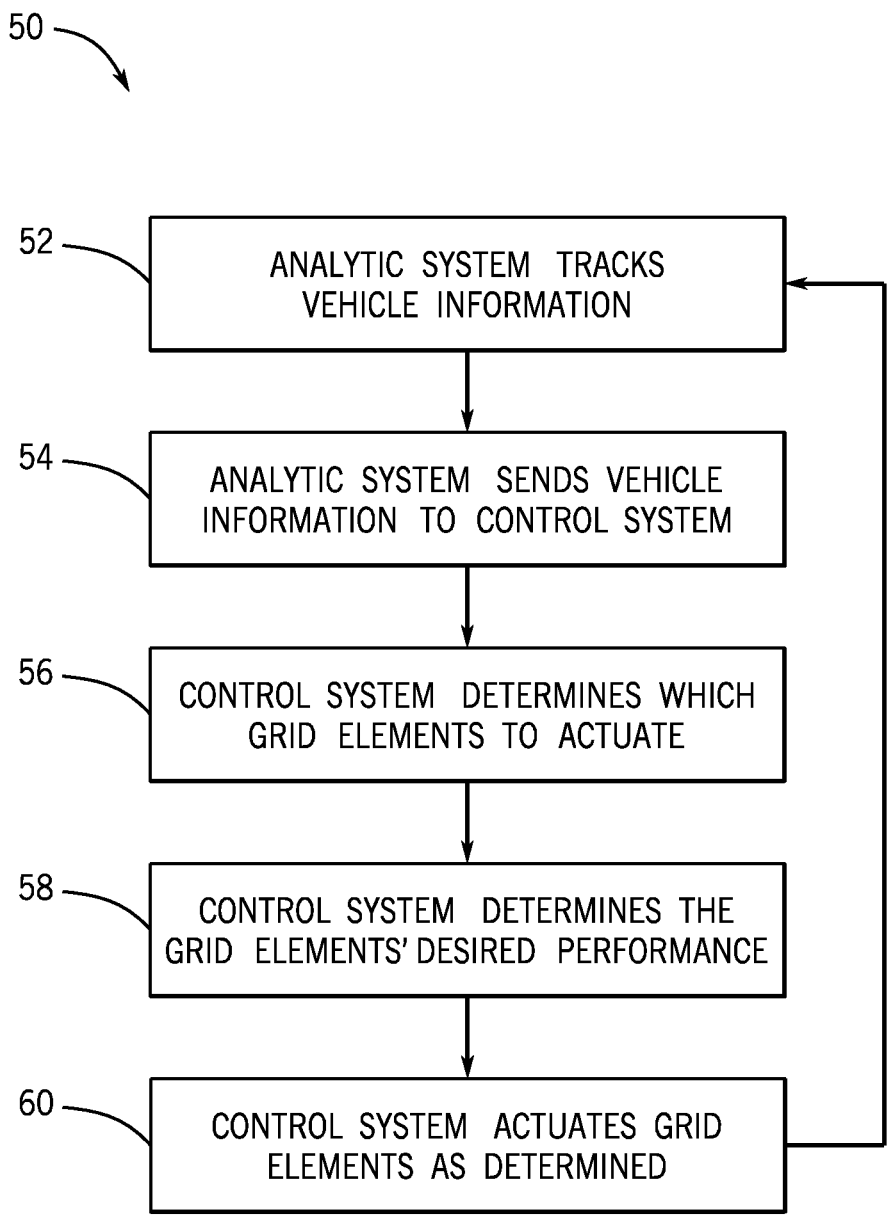
FIG. 6 is a flow diagram of a process for controlling the transportation of a vehicle utilizing an analytic system, in accordance with an embodiment.

Turning now to FIG. 6, which is a flow diagram of a process 50 for controlling the transportation of a vehicle utilizing an analytic system. The process 50 may include the analytic system tracking vehicle information (process block 52), the analytic system sending vehicle information to a control system (process block 54), the control system determining which grid elements to actuate (process block 56), the control system determining the grid elements' desired performance (process block 58), and the control system actuating the grid elements as determined (process block 60). This process 50 may operate in a loop to continually adjust for measured performance. More specifically, in process block 52, the analytic system may continuously track certain vehicle information as the vehicles drive around the dynamic driving area by utilizing an optic system. The optic system may include a sensor, such as a camera, that tracks the position, the velocity, the acceleration, the size, and so forth of the vehicles. Some of this information (e.g., size of the vehicle) may be preprogrammed and assigned to a specific identifier for a vehicle that the sensor can detect. As the analytic system acquires the vehicle information, it may send the vehicle information to the control system (process block 54). Thus, the analytic system and the control system may be communicably coupled via a wireless network, a wired network, or some combination thereof. In some embodiments, the analytic system and the control system may be encapsulated as components in one integrated unit. Further, in other embodiments, there may be numerous analytic systems that each have their own individual control system that may control certain grid elements. In yet other embodiments, numerous analytic systems may each communicate to a central control system that controls all of the grid elements in a dynamic driving area.

The control system may accept the vehicle information as inputs when determining which grid elements to actuate to perform a desired maneuver and/or effect throughout the dynamic driving area (process block 56). The control system may select numerous grid elements to actuate in order to achieve the desired maneuver and/or effect and it may dynamically coordinate which grid elements to actuate as the vehicle traverses the dynamic driving area. This may be beneficial for shows and/or rides where the vehicle is able to motivate itself through the dynamic driving area and the vehicle does not follow a set path. The control system can use the vehicle information, such as position data, to determine where the vehicle is on the dynamic driving area at any given time. Further, the control system can utilize the vehicle velocity to determine how quickly the vehicle may arrive at a certain portion of the dynamic driving area. As a result, the control system can plan ahead to lead the vehicle by choosing the grid elements to actuate that lie in the vehicle's projected path at the right moment. When the time is right, the vertical actuators of the grid elements may raise the movement control units through their associated holes above the surface to interact with the tires of the vehicle.

In addition, the control system may determine the selected grid elements' desired performance (process block 58). This may include determining the direction that the rotation configuration unit should cause the movement control unit of each grid element to apply force to the vehicle (forward or reverse), the speed the rotation configuration unit should cause the movement control unit to move (e.g., angular speed to spin the wheel, strength of magnetic field), the angle at which the movement control unit should be positioned (e.g., planar direction) by the direction configuration unit to control the direction of the vehicles' movement as needed, and so forth. After the control system determines which grid elements to actuate (process block 56) and the desired performance of each grid element (process block 58), the control system may actuate the selected grid elements as determined (process block 60). In some embodiments, the control system may send command instructions to each grid element that may include the timing, angular position, velocity, and force direction (e.g., forward or reverse) information. As the vehicle approaches, the grid elements may actuate in a coordinated sequence to perform the desired maneuver and/or effect, such as time-controlled action. It should be noted, that in an embodiment, the control system may communicate with the vehicle directly to cut off the driver's control right before or as soon as the vehicle comes into contact with the actuated grid elements. In this way, the vehicle's movement is controlled by the grid elements and not the driver during specialized maneuvers and/or effects.

In another embodiment, the system may control the transportation of a vehicle through a dynamic driving area based on predefined programming. In other words, the vehicle's transportation is passively controlled throughout the dynamic driving area, in that the grid elements performance is predetermined. In this embodiment, the dynamic driving area may include multiple grid elements throughout the portions of the show and/or ride where the vehicle will travel. The grid elements' actuation timing, planar position angle, velocity (e.g., rotational speed), and force direction (e.g., forward or reverse) may be preprogrammed and stored in the control system's memory or in a memory internal to the grid elements. As such, the vehicles' are placed on the dynamic driving area and the grid elements actuate as commanded at the proper times to move the vehicles across the dynamic driving area. This may be done in coordination with separate vehicle motivators or with only the grid elements. In one embodiment, the vehicles may not be capable of motivating themselves and drivers and/or patrons may be placed in the vehicles to create the impression that the car is being operated by a person. For example, to create the time-controlled action effect using the passive embodiment, certain grid elements may speed the dummy vehicle up to a certain velocity (e.g., 60 mph) by applying force in a forward direction, near instantaneously decelerate the vehicle to a desired speed (e.g., 10 mph) by applying force in a reverse direction, direct the vehicle through a maneuver (e.g., up to 360° spin move) by angling the movement control units synchronously, and rapidly accelerate the vehicle away by applying force in a forward direction.

Figure 7:
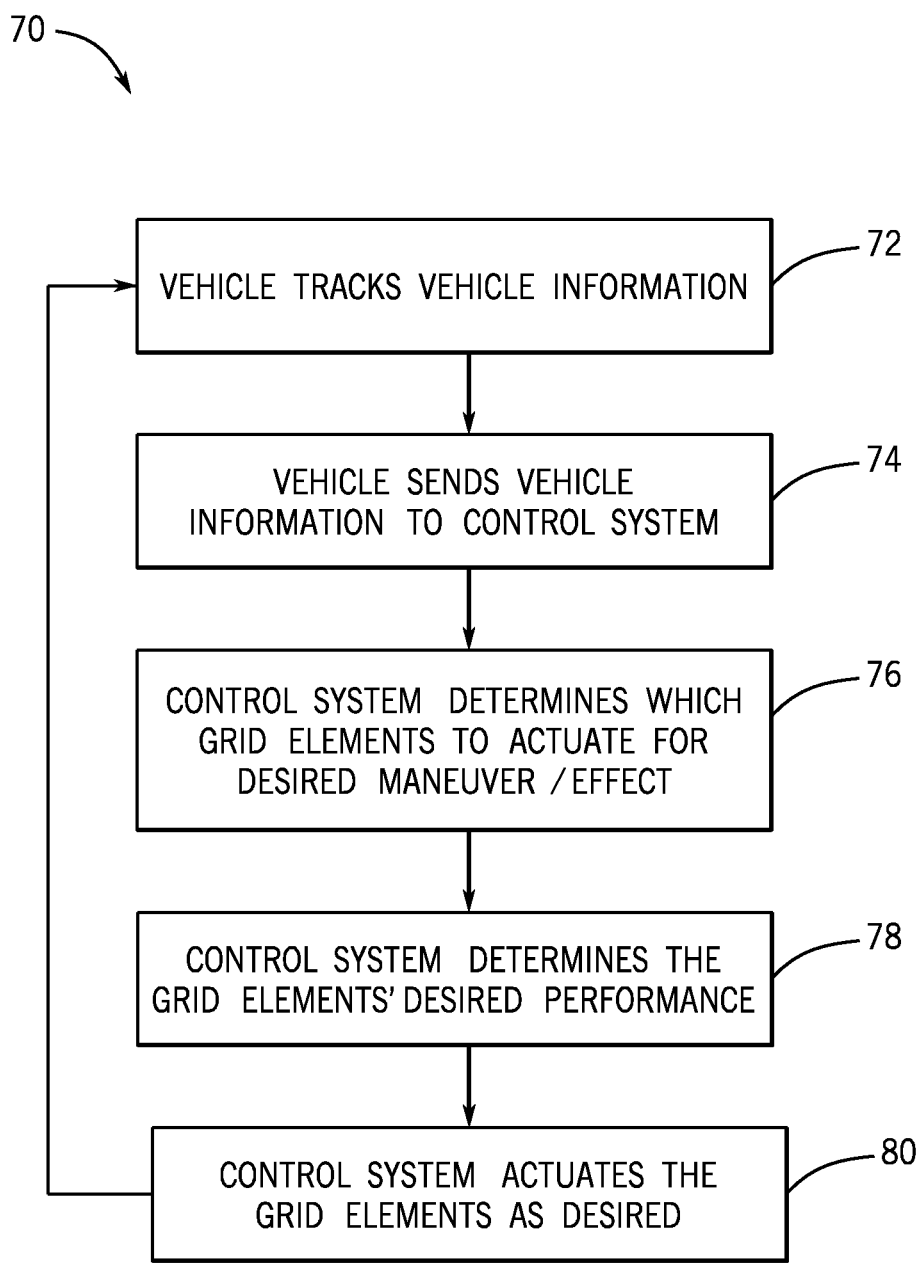
FIG. 7 is a flow diagram of a process for controlling the transportation of a vehicle utilizing a position tracking system, in accordance with an embodiment.

Another flow diagram describing an embodiment of a process 70 for controlling the transportation of a vehicle utilizing a position tracking system is shown in FIG. 7. The process 70, which can be implemented as a continuous control loop, may include the vehicle tracking its vehicle information (process block 72), the vehicle sending the vehicle information to the control system (process block 74), the control system determining which grid elements to actuate for a desired maneuver and/or effect (process block 76), the control system determining the selected grid elements' desired performance (process block 78), and the control system actuating the grid elements as desired (process block 80). More specifically, in process block 72, the vehicle may track certain information by utilizing a position tracking system. In some embodiments, the position tracking system may include transmitters, such as RFID transmitters, that provide signals to the control system, and that may be used to determine position information. In other embodiments, the position tracking system may include lasers that are emitted and bounce off of sensors located throughout the driving area to determine position information (e.g., angular velocity). Further, the vehicle may include an internal monitor (e.g., a computer with one or more processors) that tracks the vehicle's velocity and acceleration and a tangible, machine-readable memory (e.g., a hard drive) that stores the dimensions of the vehicle's size.

Then, in process block 74, the vehicle may utilize a communication module to send the vehicle information to the control system. Thus, in some embodiments, the vehicle and the control system may be in direct communication with each other. The control system may be configured to accept the vehicle information from the vehicle, which may include the vehicle's velocity, size, position, acceleration, and so forth, and determine which grid elements to actuate for a desired maneuver and/or effect (process block 76), such as time-controlled action, based on the vehicle information.

In addition, the control system may determine the selected grid elements' desired performance (process block 78). This may include determining the direction that the rotation configuration unit should cause the movement control unit of each grid element to apply force to the vehicle (forward or reverse), the speed the rotation configuration unit should cause the movement control unit to move (e.g., speed to rotate the tire, strength of magnetic field), the planar position angle the direction configuration unit should cause the movement control unit to be positioned to control the direction of the vehicles' movement as needed, and so forth. After the control system determines which grid elements to actuate (process block 76) and the desired performance of each grid element (process block 78), the control system may actuate the selected grid elements as determined (process block 80). In some embodiments, the control system may send command instructions to each grid element that may include the timing, angular position, velocity, and force direction (e.g., forward or reverse) information. As the vehicle approaches a certain active portion of the dynamic driving area, the corresponding grid elements may be actuated in a coordinated sequence to perform the desired maneuver and/or effect, such as time-controlled action. In an embodiment, the control system may communicate with the vehicle to cut off the driver's control right before or as soon as the vehicle comes into contact with the actuated grid elements. In this way, the vehicles' movement is controlled by the grid elements and not the driver during specialized maneuvers and/or effects.

As discussed above with reference to FIG. 6, in some embodiments the determination of which grid elements to actuate and their performance may be active in that the control system chooses which grid elements to actuate and how they are to perform in near real time based on where the vehicle is located in the dynamic driving area, how fast the vehicle is going, the desired maneuver to perform, and so forth. In other embodiments, the determination of which grid elements to actuate and how they should perform may be passive in that the determinations and performances are preprogrammed into the control system or the grid elements and the vehicle may be conveyed through a predetermined route.

Figure 8:
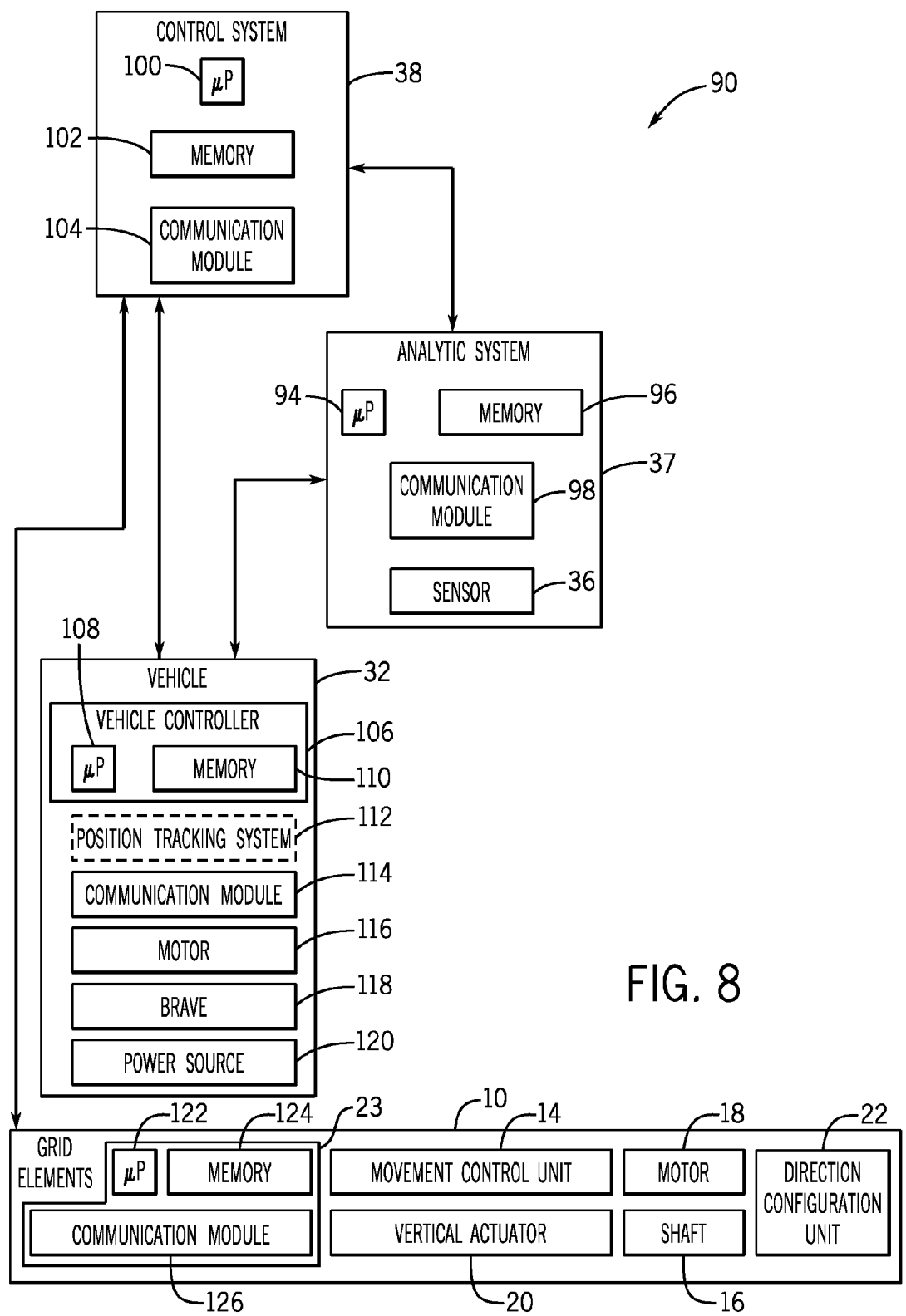
FIG. 8 illustrates a block diagram of a system configured to perform the processes of FIG. 6 and FIG. 7, in accordance with an embodiment.

A block diagram of a system 90 configured to perform the process of FIGS. 6 and 7 is illustrated in FIG. 8. The system 90 may include grid elements 10, an analytic system 37, and a control system 38. As previously discussed, the system 90 may be configured to control the transportation of a vehicle 32 throughout a dynamic driving area where the grid elements 10 are installed. Indeed, the system 90 may be enabled to cause the vehicle 32 to perform specialized maneuvers and/or effects, such as time-controlled action. The analytic system 37, the control system 38, and the grid elements 10 may include various components to enable the vehicle 32 to perform the specialized maneuvers and/or effects. In some embodiments, each grid element 10 may be individually controlled or controlled as a set. Likewise, the vehicle 32 may include components that enable it to be controlled in desired ways.

The analytic system 37 may include a processor 94, a memory 96, a communication module 98, and a sensor 36. The processor 94, which may represent one or more processors, may be any type of computer processor or microprocessor capable of executing computer-executable code. The memory 96, which may represent one or more memory components, may be any suitable articles of manufacture that can serve as media to store processor-executable code, data, or the like. These articles of manufacture may represent tangible, non-transitory computer-readable media (e.g., any suitable form of tangible memory or storage) that may store the processor-executable code used by the processor 94 to perform the presently disclosed techniques. The memory 96 may also be used to store the vehicle information acquired by the sensor 36. The communication module 98 may be a wireless or wired communication component that may facilitate communication between the analytic system 37 and the control system 38. As such, the communication module 98 may include a wireless card or data port (e.g., Ethernet) capable of transmitting and receiving data. The sensor 36 may include an optic system that utilizes a camera to track certain vehicle information.

The control system 38 may include a processor 100, a memory 102, and a communication module 104. The processor 100, which may represent one or more processors, may be any type of computer processor or microprocessor capable of executing computer-executable code. The memory 102, which may represent one or more memory components, may be any suitable articles of manufacture that can serve as media to store processor-executable code, data, or the like. These articles of manufacture may represent tangible, non-transitory computer-readable media (e.g., any suitable form of tangible memory or storage) that may store the processor-executable code used by the processor 100 to perform the presently disclosed techniques, such as determining which grid elements to actuate and how they are to perform. The memory 102 may also be used to store the vehicle information received from the analytic system 37. The communication module 104 may be a wireless or wired communication component that may facilitate communication with the analytic system 37, the vehicle 32, and the grid elements 10. As such, the communication module 104 may include a wireless card or data port (e.g., Ethernet) capable of transmitting and receiving data. For example, after making the determinations, the processor 100 may instruct the communication module 104 to send command instructions (e.g., actuation timing, force direction, amount of force to apply, angular direction information) to selected subsets of or individual grid elements 10.

The vehicle 32 may include a vehicle controller 106, which may include a processor 108 and a memory 110, a position tracking system 112, a communication module 114, a motor 116, a brake 118, and a power source 120. The processor 108, which may represent one or more processors, may be any type of computer processor or microprocessor capable of executing computer-executable code. The memory 110, which may represent one or more memory components, may be any suitable articles of manufacture that can serve as media to store processor-executable code, data, or the like. These articles of manufacture may represent tangible, non-transitory computer-readable media (e.g., any suitable form of tangible memory or storage) that may store the processor-executable code used by the processor 108 to perform the presently disclosed techniques, such as disable the driver's control of the vehicle when commanded by the control system 38. In some embodiments, the memory 110 may also be used to store the vehicle's information such as size dimensions (e.g., weight, length, width, height), velocity, acceleration, and so forth. The communication module 114 may be a wireless communication component that may facilitate communication with the control system 38. As such, the communication module 114 may include a wireless card capable of transmitting and receiving data. For example, the processor 100 may instruct the communication module 114 to send the vehicle information to the control system 38 so the control system 38 can determine which grid elements 10 to actuate and how they should perform.

To provide movements of the vehicle 32, the vehicle 32 includes the motor 116 and the brake 118. The movements of the vehicle 32 may include accelerating, decelerating, turning, and stopping of the vehicle 32. The motor 116 may be powered by any suitable power source 120, including, but not limited to, a battery, a solar panel, an electrical generator, a gas engine, or any combination thereof. In embodiments where the vehicle is enabled to be driven by a driver, the operations of the motor 116 and the brake 118 may be controlled by the vehicle controller 106. For example, the vehicle controller 106 may control the motor 116 to adjust its output power to accelerate or decelerate the vehicle 32. The vehicle controller 106 may also control the brake 118 to decelerate or stop the vehicle 32. Further, the vehicle controller 106 may operate under instructions from the driver via an operator interface or from the control system 38, which may override driver instructions (e.g., by shutting down driver control once grid elements are engaged).

The position tracking system 112 may monitor the vehicle's position in the dynamic driving area. In one embodiment, the position tracking system 112 interacts with sensors in the dynamic driving area. Each sensor represents a unique location (e.g., coordinates relative to one or more reference points) in the dynamic driving area. In such an embodiment, the vehicle position tracking system 112 includes a reader that may sense an identifier associated with a vehicle or a specific portion of a vehicle (e.g., front, right bumper) to provide the position information of the vehicle 32. The reader may then supply the position information to the control system 38, which in turn determines which grid elements 10 to actuate and how each should perform for a desired maneuver and/or effect. As previously mentioned, in some embodiments, the position tracking system 112 may include RFID tags and/or emitted lasers to provide and/or acquire position information. In embodiments where the analytic system 37 tracks the vehicles' information utilizing the sensor 36, the vehicles 32 may not include the position tracking system 112.

The grid elements 10 may include communication and control circuitry 23 (processor 122, memory 124, and communication module 126), a movement control unit 14, a shaft 16, a motor 18, a vertical actuator 20, a direction configuration unit 22, or some combination thereof. The processor 122, which may represent one or more processors, may be any type of computer processor or microprocessor capable of executing computer-executable code. The memory 124, which may represent one or more memory components, may be any suitable articles of manufacture that can serve as media to store processor-executable code, data, or the like. These articles of manufacture may represent tangible, non-transitory computer-readable media (e.g., any suitable form of tangible memory or storage) that may store the processor-executable code used by the processor 122 to perform the presently disclosed techniques. For example, in embodiments where the grid elements 10 are preprogrammed to operate without command instructions from the control system 38, the processor-executable code may include instructions related to when to vertically actuate, which direction to apply force, how much force to apply (e.g., speed or strength of magnetic field), which angle to position, and so forth. Additionally or alternatively, in embodiments where the grid elements 10 are configured to receive command instructions from the control system 38, the processor-executable code may include instructions related to receiving, validating, and/or executing the command instructions.

The communication module 126 may be a wireless or wired communication component that may facilitate communication with the control system 38. As such, the communication module 126 may include a wireless card or data port (e.g., Ethernet) capable of transmitting and receiving data. For example, the communication module 126 may be configured to receive command instructions from the control system 38.

In one embodiment, data is transferred between the analytic system 37 and the control system 38 at least in part via a wireless or wired network. The analytic system 37 may transfer data including vehicle information, as discussed above, to the control system 38 as it is tracked by the sensor 36. To reiterate, such data may include a vehicle identifier for an individual vehicle 32 and associated position, size, velocity, traveling direction, motor output power, or the like. Based on the received data from the analytic system 37, the control system 38 may determine which grid elements 10 to actuate and how each selected grid element 10 should perform for a desired maneuver and/or effect. Then the control system 38 may send instructions to the selected grid elements 10 that act in a coordinated sequence to control the movement of the vehicle 32. For example, the grid elements 10 may enable one or more maneuvers and/or effects, such as time-controlled action by nearly instantaneously slowing the vehicle 32, causing the vehicle 32 to perform a controlled maneuver, and rapidly speeding the vehicle 32 to a faster speed. As previously mentioned, the analytic system 37 may monitor more than one vehicle 32 and send their vehicle information to the control system 38. In turn, the control system 38 may determine all of the different grid elements 10 to actuate and how they should perform in order to orchestrate numerous vehicles performing the same or different maneuvers and/or effects. In this way, numerous vehicles 32 on the dynamic driving area can be controlled to perform desired specialized maneuvers and/or effects at the same time, which may result in a highly enjoyable experience for a viewing audience and/or a riding patron.

In another embodiment, data is transferred between the vehicle 32 and the control system 38 at least in part via a wireless network. The vehicle 32 may transfer data including vehicle information, as discussed above, to the control system 38. To reiterate, such data may include a vehicle identifier for an individual vehicle 32 and associated position, size, velocity, traveling direction, motor output power, or the like. Based on the received data from the vehicle 32, the control system 38 may determine which grid elements 10 to actuate and how each selected grid element 10 should perform for a desired maneuver and/or effect. Then the control system 38 may send instructions to the selected grid elements 10 that act in a coordinated sequence to control the movement of the vehicle 32. For example, the grid elements 10 may enable one or more maneuvers and/or effects, such as time-controlled action by nearly instantaneously slowing the vehicle 32, causing the vehicle 32 to perform a controlled maneuver, and rapidly speeding the vehicle 32 to a faster speed. In this embodiment, the analytic system 37 may not be utilized.

Figure 9:
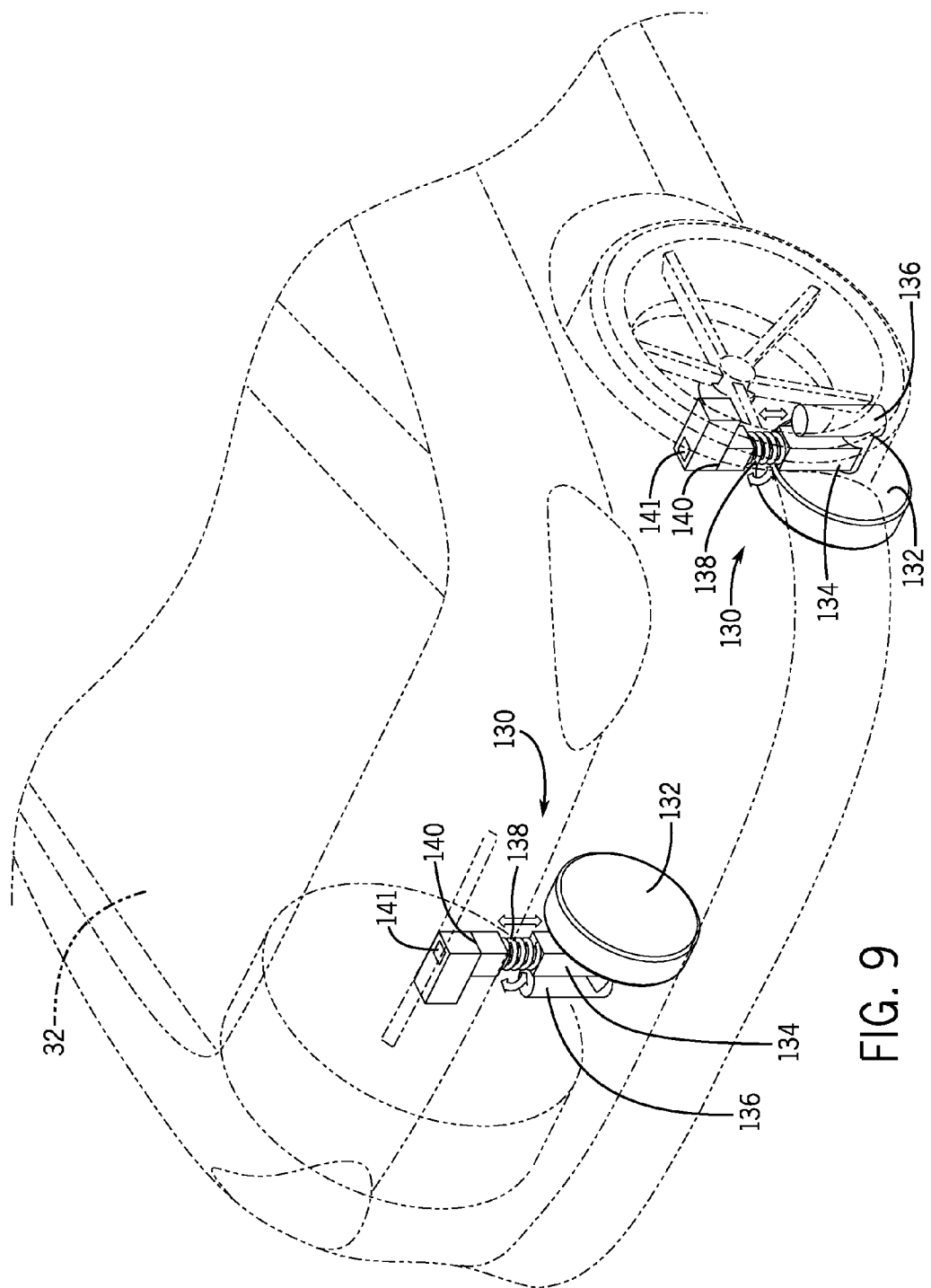
FIG. 9 illustrates a wheel element utilized to control the transportation of a vehicle, in accordance with an embodiment.

In one embodiment, the transportation of a vehicle 32 may be achieved utilizing mechanisms that are components of the vehicle 32. For example, FIG. 9, illustrates a wheel element 130 control mechanism. The wheel element 130 may include substantially similar components as the grid element 10, but the wheel element is attached to the inside of each wheel of the vehicle 32 and not a component of a dynamic driving area (e.g., installed in a hole in a surface of a dynamic driving area). Indeed, the wheel element 130 may include a movement control unit 132, a shaft 134, a motor 136, a vertical actuator 138, a direction configuration unit 140, communication and control circuitry 141, or some combination thereof. The movement control unit 132 may include a smaller wheel than the vehicle's wheel. The direction configuration unit 140 may include a gear that interlocks with cogs on a linear strip attached to the wheel or the base of the wheel element 130 and allow up to 360° rotation. The vertical actuator 138 may include a hydraulic, electric, or pneumatic lift system.

The wheel elements 130 may be controlled in a substantially similar manner as the grid elements 10. That is, the vehicle's information may be tracked by the analytic system that sends the vehicle information to the control system. The control system may determine which of the wheel elements 130 to actuate and how each should perform to execute a desired maneuver and/or effect. Then, the control system may send command instructions to the wheel elements to actuate. The command instructions may include information relating to actuation timing, force direction (e.g., forward or reverse), amount of force to apply (e.g., speed of rotation), angular position, and so forth. When the wheel elements 130 are actuated by the vertical actuator 138, the wheel elements 130 may extend downward until they contact the driving surface and lift the attached wheel off of the ground. As a result, the actuated wheel elements 130 are in control of the vehicle's movement. Based on the received command instructions received from the control system or instructions stored in an internal memory, the wheel elements may enable executing specialized maneuvers and/or effects, such as time-controlled action. Before and after the maneuver and/or effect is executed, the wheel elements 130 may be retracted by the vertical actuator 138 so that they do not contact the driving surface. As with the grid elements 10, the wheel elements 130 may be actively controlled by the control system as the vehicle 32 traverses the driving area or they may be passively controlled by executing preprogrammed maneuvers and/or effects.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
   a plurality of grid elements;
   an analytic system; and
   a control system,
   wherein the plurality of grid elements are each independently addressed by the control system and are each installed in a dynamic driving area in an attraction, wherein the plurality of grid elements are each configured to move relative to a surface of the dynamic driving area and independently of one another to control movement of a vehicle disposed on the surface of the dynamic driving area based on command instructions received from the control system, wherein the command instructions cause a subset of the plurality of grid elements to actuate to change a trajectory of the vehicle to control the movement of the vehicle along the surface of the dynamic driving area, wherein a vertical actuator of each of the plurality of grid elements is configured to cause a portion of an individual grid element to extend above the surface and another portion of the individual grid element to remain below the surface of the dynamic driving area, and wherein each of the plurality of grid elements is configured to rotate a corresponding movement control unit based on a planar direction and an angular velocity of a driven wheel at a determined actuation time;
   wherein the analytic system is configured to track, via one or more sensors, vehicle information comprising a position, a size, a velocity, an acceleration, or any combination thereof, of the vehicle, and to send the vehicle information to the control system via a communication system; and
   wherein the control system is configured to receive the vehicle information, to determine, via one or more processors, the subset of the plurality of grid elements to actuate and a corresponding manner of actuation based on the vehicle information of the vehicle, and to send the command instructions to each individual grid element of the subset of the plurality of grid elements determined for actuation.

2. The system of claim 1, wherein each grid element of the plurality of grid elements comprises the corresponding movement control unit and the vertical actuator, wherein each of the corresponding movement control units is configured to extend through a respective opening on the surface of the dynamic driving area based on actuation of each corresponding vertical actuator to control the movement of the vehicle along the surface of the dynamic driving area.

3. The system of claim 1, wherein each grid element of the plurality of grid elements comprises:
   the corresponding movement control unit at least partially extending or configured to extend through a respective opening in the surface of the dynamic driving area and a rotation configuration unit to control the movement of the vehicle; and
   a portion of the surface through which each of the corresponding movement control units vertically extends or is configured to extend, wherein the portion of the surface is configured to rotate in the planar direction with the corresponding movement control unit and the rotation configuration unit is configured to rotate the corresponding movement control unit about an axis substantially transverse with respect to the planar direction.

4. The system of claim 1, wherein each of the grid elements of the plurality of grid elements comprises the corresponding movement control unit with an upper portion extending through the surface of the dynamic driving area and aligned with an upper portion of the surface.

5. The system of claim 1, wherein each of the plurality of grid elements comprises the corresponding movement control unit configured to extend through a respective opening on the surface, a rotation configuration unit configured to rotate the corresponding movement control unit at an angular speed, and a direction configuration unit configured to turn the corresponding movement control unit into alignment with the planar direction.

6. The system of claim 1, comprising additional grid elements, wherein the control system is configured to control each grid element of the plurality of grid elements independently and the control system is configured to control the additional grid elements together as a set.

7. The system of claim 1, wherein the vehicle comprises a motor and one or more vehicle wheels comprising the drive wheel configured to rotate based on the movement of the vehicle, wherein the plurality of grid elements comprise the corresponding movement control units that comprise grid element wheels driven by respective motors of the grid elements and configured to engage with the one or more vehicle wheels to control the movement of the vehicle.

8. The system of claim 1, wherein the vehicle is one of a plurality of vehicles disposed on the dynamic driving area, wherein the command instructions cause the subset of the plurality of grid elements to actuate to change a respective trajectory of a subset of the plurality of vehicle to control movement of the subset of the plurality of vehicles.

9. The system of claim 1, wherein the vehicle comprises a reaction plate and each grid element of the plurality of grid elements comprises a linear coil.

10. The system of claim 1, wherein the vehicle comprises a position tracking system and the communication system, wherein the position tracking system comprises the one or more sensors configured to track the vehicle's position in the dynamic driving area and the communication system is configured to communicate the vehicle's position to the control system.

11. The system of claim 1, wherein each grid element of the plurality of grid elements comprises the corresponding movement control unit comprising a grid element wheel driven by a motor, wherein the grid element wheel is configured to engage the vehicle and control rotational speed, rotational direction, and angular direction of one or more wheels of the vehicle, thereby controlling the movement of the vehicle.

12. The system of claim 1, wherein the dynamic driving area comprises dynamic portions, and wherein the plurality of grid elements are installed to control the movement of the vehicle and non-dynamic portions where the plurality of grid elements are not installed and the vehicle controls its own movement.

13. The system of claim 1, wherein the command instructions comprise an angular speed at which a rotation configuration unit corresponding to each grid element of the plurality of grid elements rotates the corresponding movement control unit corresponding to each grid element of the plurality of grid elements, a direction in which the rotation configuration unit rotates the corresponding movement control unit, a planar position angle that a direction configuration unit corresponding to each grid element of the plurality of grid elements positions the corresponding movement control unit in, a time to actuate, or some combination thereof.

14. The system of claim 1, wherein each individual grid element of the plurality of grid elements comprises the vertical actuator configured to cause movement of the individual grid element between an extended position and a recessed position relative to an opening in the surface of the dynamic driving area.

15. The system of claim 1, wherein the command instructions are configured to cause to a first grid element of the subset to actuate in a first manner and a second grid element of the subset to actuate in a second manner different from the first manner.

16. The system of claim 15, wherein the command instructions cause the first grid element to be oriented at a different angle relative to the second grid element.

17. A system, comprising:
a plurality of grid elements disposed in a dynamic driving area of an amusement attraction;
an analytic system; and
a control system,
wherein each grid element of the plurality of grid elements is independently addressed by the control system and is configured to move relative to a surface of the dynamic driving area and independently of one another to control movement of a vehicle disposed on the surface of the dynamic driving area when one or more grid elements of the plurality of grid elements is engaged with the vehicle, the analytic system monitors information of the vehicle comprising an angular velocity and a planar direction of a driven wheel of the vehicle, and send the information to the control system, and the control system sends command instructions to the one or more grid elements of the plurality of grid elements to actuate the one or more grid elements of the plurality of grid elements to change a trajectory of the vehicle along the surface of the dynamic driving area, wherein the command instructions actuate the one or more grid elements of the plurality of grid elements comprise causing a portion of the plurality of grid elements to extend beyond the surface, while another portion of the plurality of grid elements remain below the surface of the dynamic driving area and to rotate a corresponding movement control unit based on the planar direction and the angular velocity of a driven wheel at a determined actuation time.

18. The system of claim 17, wherein the analytic system is configured to monitor a plurality of driven wheels of the vehicle and the control system accounts for the plurality of driven wheels before sending the command instructions to the one or more grid elements.

19. The system of claim 17, wherein a portion of the dynamic driving area is configured to rotate in the planar direction at least when the vehicle is located on the portion of the dynamic driving area.

20. The system of claim 17, wherein the plurality of grid elements are configured to control the movement of the vehicle by one or more movement control units engaging the driven wheel of the vehicle and counteracting an angular direction associated with the angular velocity of the driven wheel.

21. A method, comprising:
tracking, via an analytic system, vehicle information for one or more vehicles, wherein the one or more vehicles are driving on or approaching a surface of a dynamic driving area of an attraction;
sending, via the analytic system, the vehicle information to a control system communicably coupled to the analytic system;
determining, via the control system, which subset of a plurality of grid elements installed in the surface of the dynamic driving area to actuate to change a corresponding trajectory of the one or more vehicles along the surface of the dynamic driving area and a manner of actuation of the subset based on the vehicle information received by the control system from the analytic system and a maneuver for the one or more vehicles, wherein a vertical actuator of each of the plurality of grid elements is configured to cause a portion of the individual grid element to extend above the surface and another portion to remain below the surface of the dynamic driving area and wherein each of the plurality of grid elements is configured to rotate a corresponding movement control unit based on a planar direction and an angular velocity of a driven wheel at a determined actuation time;
sending, via the control system, command instructions to each individual grid element of the subset of the plurality of grid elements determined for actuation; and
executing the command instructions via movement control units corresponding to respective grid elements of the subset of the plurality of grid elements determined for actuation, wherein the command instructions causes at least the subset of grid elements of the plurality of grid elements to actuate relative to the surface of the dynamic driving area and independently of one another to control the movement of the one or more vehicles.

22. The method of claim 21, wherein each grid element of the plurality of grid elements comprises a processor configured to execute the command instructions received from the control system.

23. The method of claim 21, wherein the command instructions comprise a time to vertically actuate the corresponding movement control unit for a vertical actuator of each grid element of the plurality of grid elements, the planar direction in which to position the corresponding movement control unit for a direction configuration unit of each grid element of the plurality of grid elements, a rotational direction in which to rotate the corresponding movement control unit for a rotation configuration unit of each grid element of the plurality of grid elements, a speed at which to rotate the corresponding movement control unit for the rotation configuration unit, or some combination thereof.

24. The method of claim 21, wherein the movement control units corresponding to each grid element of the plurality of grid elements control the movement of the one or more vehicles according to the command instructions by engaging one or more wheels corresponding to each vehicle of the one or more vehicles, wherein the one or more wheels traverse over the corresponding movement control unit actuating on the dynamic driving area.

* * * * *